(12) United States Patent
Summers

(10) Patent No.: US 10,940,873 B1
(45) Date of Patent: Mar. 9, 2021

(54) MODIFIED PASSENGER, SUITABLE OR NEWLY MANUFACTURED RAILROAD CARS PROVIDE ELECTRICAL CHARGING FOR BATTERY-POWERED ELECTRIC AUTOMOBILES WHILE IN TRANSIT

(71) Applicant: Monique Irena Summers, San Jose, CA (US)

(72) Inventor: Monique Irena Summers, San Jose, CA (US)

(*) Notice: Subject to any disclaimer, the term of this patent is extended or adjusted under 35 U.S.C. 154(b) by 0 days.

(21) Appl. No.: 16/873,736

(22) Filed: Jun. 22, 2020

(51) Int. Cl.
*B61D 3/18* (2006.01)
*B60L 53/30* (2019.01)
*B61D 47/00* (2006.01)

(52) U.S. Cl.
CPC .............. *B61D 3/187* (2013.01); *B60L 53/30* (2019.02); *B61D 47/005* (2013.01)

(58) Field of Classification Search
CPC ........ B61D 3/187; B61D 47/005; B61D 3/18; B61D 3/181; B60L 53/30; B60L 53/57; B60L 9/00
See application file for complete search history.

(56) References Cited

U.S. PATENT DOCUMENTS

| | | | | |
|---|---|---|---|---|
| 3,285,194 A * | 11/1966 | Clejan | ............... | B61D 3/181 104/27 |
| 3,557,712 A * | 1/1971 | Milenkovic | ............... | B61F 3/12 410/4 |
| 3,785,514 A * | 1/1974 | Forsyth | ............... | B60P 3/07 414/373 |
| 5,562,374 A * | 10/1996 | Plamper | ............... | B61D 1/06 105/1.1 |
| 6,591,758 B2 * | 7/2003 | Kumar | ............... | B60L 7/12 105/35 |
| 2011/0127944 A1 * | 6/2011 | Saito | ............... | B60L 53/11 320/101 |
| 2013/0069592 A1 * | 3/2013 | Bouman | ............... | B60L 53/55 320/109 |

FOREIGN PATENT DOCUMENTS

DE 9406428 U1 * 6/1994 .......... B61D 47/005

* cited by examiner

*Primary Examiner* — Mark T Le

(57) ABSTRACT

A modified, hollowed-out, bi-level double decker passenger car is equipped to provide electricity to electrically charge the batteries of battery-powered electric automobiles, either on a car by car basis, using the wheels of the car to generate electricity, or as the whole of the train supplied with power generated by a locomotive, a designated generator car, or an outside source.

2 Claims, 5 Drawing Sheets

MODIFIED PASSENGER, SUITABLE OR NEWLY MANUFACTURED RAILROAD CARS PROVIDE ELECTRICAL CHARGING FOR BATTERY-POWERED ELECTRIC AUTOMOBILES WHILE IN TRANSIT

BACKGROUND OF THE INVENTION

Battery powered electric automobiles are now being mass-produced. The problem with these automobiles is they are limited in their range of travel. The batteries of some of these vehicles must be re-charged every hundred miles. It takes several hours to re-charge the batteries, and this limits the practical use of these vehicles to local areas only. A means of increasing their range of use must be met before more consumers will be willing to purchase more electric automobiles.

One method of extending the range of use of the electric automobile is to equip railroad cars with an electrical system that would charge the batteries of these automobiles while they are being carried and transported on railroad cars.

The existing railroad tracks are adequate. The tracks require minimal modifications to load and unload the vehicles at the railroad stations. The width or length of the car does not need to be altered. The dimensions of the car are in accord with code. An electric automobile such as a Smart car, or similar-sized automobile, fits across the car's bed, and does not extend beyond the width of the car. The car is able to travel normally along the train tracks, easily passing through tunnels, negotiating overpasses, and traversing bridges without any difficulty.

There is a tremendous amount of responsibility in handling the amount of rolling stock that crosses the country each day. In order, to determine how much power, speed or force is needed, engineers use formulas to calculate the numerous functions of running a train. A formula is used to calculate force levels when starting a train. Another formula is used to determine drawbar force or how much tonnage a road engine can handle. If more speed is needed, a formula is used to calculate how much power is required, and also, how many extra helper locomotives should be in the road consist, and where they should be placed. These locomotives or helpers, as they are called, are needed to push and pull the train up a grade. The helpers also aid in controlling the speed of the train when the train is traveling down a grade.

As with other fields of expertise, engineers have their own terminology whereby just one of two words or letters can explain a whole subject matter. This is the case of the term head-end power (HEP) or electric train supply (ETS). Engineers use the term head-end power (HEP) or electric train supply (ETS) to define the electrical distribution system of a passenger train. The source of the power is usually a locomotive, or a generator car, at the front of or "head" of the train, hence the name head-end power. The initials HEP also stand for the term hotel electric power (HEP) which equates to: electricity used by hotels and trains for heating, lighting, climate control, refrigeration, cooking and other electrical needs. HEP is used only for domestic type needs except in case of an emergency. A situation is deemed an emergency when a locomotive is pulling the train up a steep incline and more power is needed to climb the grade. Power used for HEP can be diverted in this instance to help the train climb the grade. It is evident that running a train has many complexities, in regard to: the amount of formulas, calculations and mechanical aspects railroad engineers address each day.

HEP is one electrical system whereby a single locomotive or dedicated generator car produces a portion of the electricity for the train. Trains also have another electrical system, which consist of locomotives, or helpers, that drive the train. The helpers are also needed to push and pull the train up a grade, or control the speed of a train when the train is traveling down a grade. Extra helper locomotives are strategically placed throughout the train when it is determined that the train will need more power.

A third electrical system will need to be formed, in order to create enough electricity, to charge the batteries of the electric automobiles, and accommodate their weight. There is also the aspect that the automobiles will be continuously loaded and unloaded at each station. Engineers will need to formulate and initiate the necessary calculations needed to supply the force, compile the tonnage, and determine how many helper locomotives will be needed in the consist.

Ten years ago, we told our population was going triple. It is quite evident that has happened. Our freeways are jammed with automobiles during rush hour traffic. Our population will probably triple again in another ten years. We need to deal with the amount of automobiles on our freeways. Ten years ago, in 2010, the writer applied for a patent "Railroad Cars Provide Electrical Charging for Battery-Powered Electric Automobiles While in Transit." The time wasn't right. The automobiles were too large to fit across the car. Electric automobiles were still in their infancy. Today, there are automobiles like the Smart car and other similar sized automobiles that are suited for being carried and charged on railroad cars. As gas prices become too expensive, to drive the larger automobiles to work and home each day, more people will turn to the smaller automobiles for their transportation.

In 1966 Robert La Mar Johnson received a patent for his invention in which he proposed a "Railroad Car for Transporting o Automobiles and Passengers". Johnson's invention is quite complex in that it comprises a railroad car that carries automobiles in both the upper and lower levels of the car. The car has seven separate compartments each of which house one automobile. The lower level of the car contains three single automobile carrying compartments. The upper level contains two single automobile carrying compartments. Each of the lower level compartments consists of separate individual floors that sit above that of the car's bed.

In order to load and unload the automobiles, all of the individual compartments must swing out horizontally sixty degrees utilizing a vertical shaft mechanism. Each of the compartments has a gate, which swings vertically to become a ramp to load or unload an automobile. When lowered for loading or unloading, the gate/ramp rests upon a dock, provided at one side of the railroad tracks. An automobile is driven, directly into a compartment to load, or out of the compartment to unload.

The amount of mechanical parts and wiring that is needed, to activate and run all the separate compartments, is cost prohibitive. Turning a compartment sixty degrees in or out of the car, and moving the ramp/gate, in addition to the weight of an automobile, puts stress on the moving parts. The amount of problems encountered from the moving parts and electric systems breaking down would be high. It would also be time consuming at each station to load, and unload and reload the compartments as the train only stop for a few minutes at most stations.

BRIEF SUMMARY OF THE INVENTION

There are two main differences between Johnson's invention and my invention. The first difference is that of charging of the batteries of newly manufactured battery-powered electric automobiles on a car during transport. My invention charges the batteries of battery-powered electric automobiles while in transit. Johnson received his patent in 1966 before the mass production of electric automobiles. There were scarcely any electric automobiles to speak of at that time.

The second difference of the two inventions is the amount of mechanical parts and time it takes to load and unload an automobile. Johnson's invention has a substantial amount of metal moving parts and wiring, that would be a cause for concern regarding the stress on the moving parts. Each compartment must be turned outward sixty degrees and a ramp distended before an automobile can be loaded. Once the automobile is loaded in the compartment, the compartment must be turned back into the car sixty degrees with the weight of the automobile. Again, the stress on the moving parts and the time needed to load and unload the automobiles would be cost prohibitive.

My invention takes only seconds to load and unload an automobile. The commuter drives his or her automobile straight into a compartment onto the car using loading docks that are level with the bed of the car. No moving parts are required to load and unload an automobile.

In accordance with one embodiment a modified hollowed-out, bi-level passenger car provides electricity to electrically charge the batteries of battery-powered electric automobiles, either on a car by car basis, using the wheels of the car to generate electricity, or as the whole of the train supplied with power generated by a locomotive, a designated generator car, or an outside source. The loading and unloading of the automobiles is simple and straight forward.

The commuter drives his or her automobile straight into a compartment on the car using loading docks that are level with the bed of the car. To unload an automobile is as simple as loading an automobile. The commuter drives his or her automobile straight out of the compartment and onto a dock to unload. No mechanical parts are required to load and unload an automobile.

The improvements of one or more of the aspects are as follows: that a modified bi-level passenger car is specifically manufactured to charge the batteries of battery-powered electric automobiles while in transit, that the power to charge the batteries is generated either on a car by car basis using the wheels of the car to generate electricity, or as the whole of the train being supplied with power by a locomotive and designated generator car, or a third rail, that the car has suitable trucks of conventional construction which are located underneath the bed of the car, that the trucks support the entire car on rails, that the car is suitably braced and framed, that the bed of the car has a number of same sized and same-spaced automobile compartments, that electrical wiring and an electrical outlet are housed in and on a stanchion that is bolted to the floor in each compartment, that the stanchion is the charging station where the automobile's power plug is inserted into an outlet on the charging station, that each compartment allows for the width of one Smart car, or similar-sized automobile to sit safely across the bed of the car during transport, that no mechanical parts are employed to load or unload the automobiles, that the loading and unloading of the car is simple and efficient using loading and unloading docks that are on the same level as the bed of the car.

Other improvements of one or more aspects will become apparent from the drawings and following descriptions.

DETAILED DESCRIPTION OF THE INVENTION

I. Structure

Figure 1A:
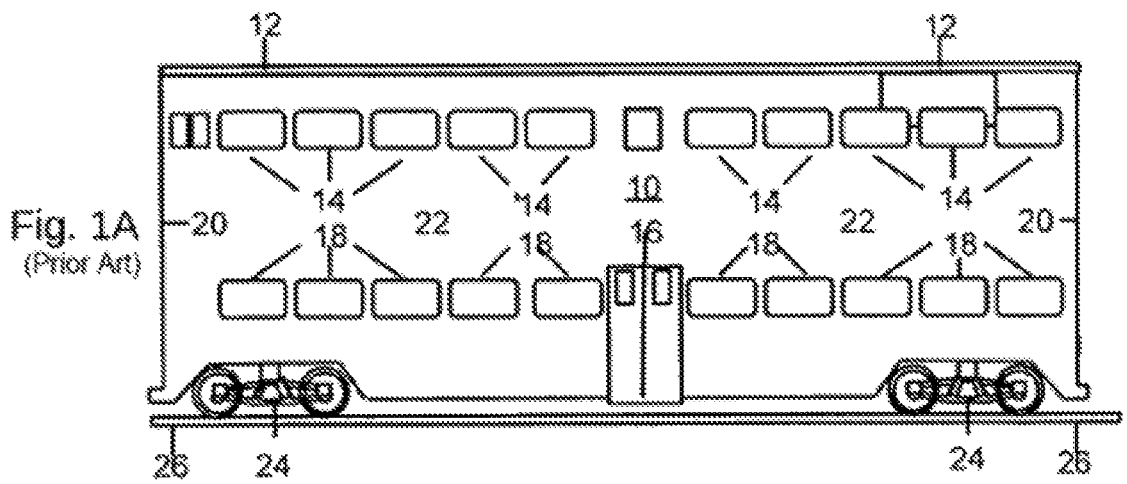
FIG. 1A shows a conventional bi-level railroad passenger cars

FIG. 1A shows various aspects of a conventional bi-level railroad passenger car 10. The car has rigid end and side walls 20. The roof 12 of the car is supported by the rigid end and side walls. There are windows 14, 18 in the upper and lower levels. There is seating for passengers in both the upper and lower levels (Not shown). Entrance/exit doors 16 are on the lower level. The bed of the car sits above suitable trucks which support the body of the car on rails in accordance with one embodiment.

Figure 1B:
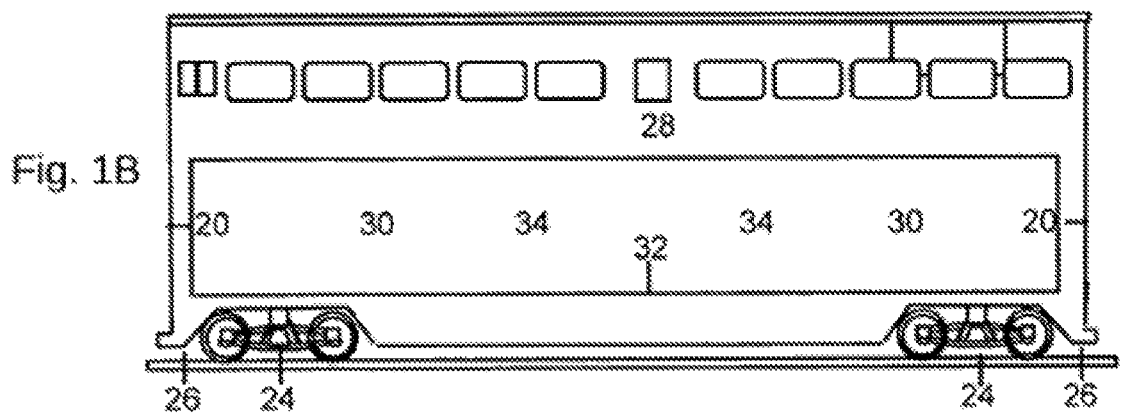
FIGS. 1B-1C show a modified bi-level railroad passenger car in accordance with one embodiment.

FIG. 1B shows various aspects of modified bi-level passenger car 28. There are rigid end walls 20 the same as in a conventional passenger car. The upper section of the rigid side walls remains the same as in the conventional passenger car, but the lower section, of the rigid side walls 34, has been removed. The removal, of the lower section of the rigid side walls, allows automobiles easily to enter and exit the bed of the car. The modified car has a number of automobile compartments, which are lined-up, side by side, across the bed of the car. The compartments are equal in size and shape. An electric automobile, such as a Smart car, or similar sized automobile fits across the bed of the car and does not extend beyond the width of the car.

The train has electrical cables that transmit power from one car to the next throughout the length of the train. Every car in the conscript carries what is termed a full electric load of the train irrespective of where a car is placed in the train. The car thus becomes a part of the electrical circuit for the entire train.

The modified railroad passenger car supports a complete electrical charging system to charge the batteries of several electric automobiles while in transit in accordance with one embodiment.

Figure 1C:
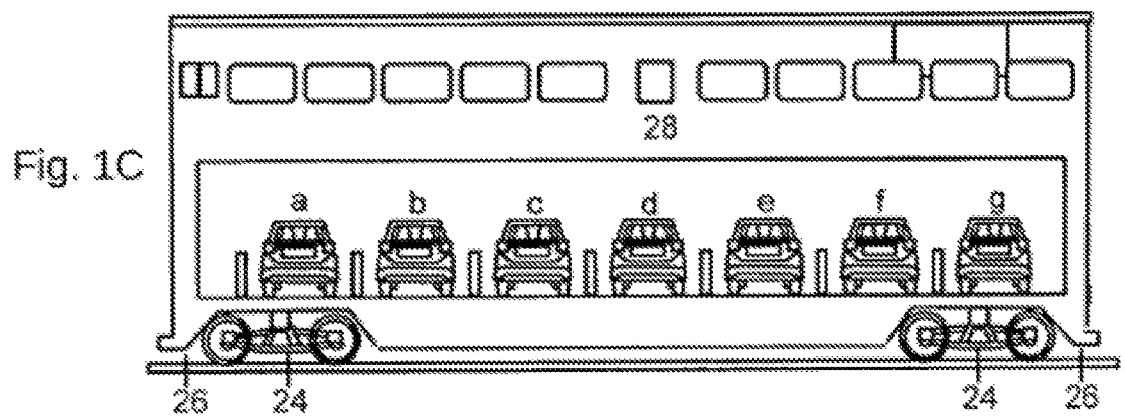

FIG. 1C shows a modified bi-level railroad passenger car 28 with a hollowed out lower level on first floor. The hollowed out lower level of the car allows automobiles to easily load onto the car. The car's bed is street level with the docks and the automobiles drive straight onto the bed of the car from the dock. The illustration shows the car has seven automobiles (a-g) loaded and ready to have their power cords connected to the outlet on the charging station. The car is capable of carrying, charging and transporting a number of automobiles in accordance with another embodiment.

Figure 2:
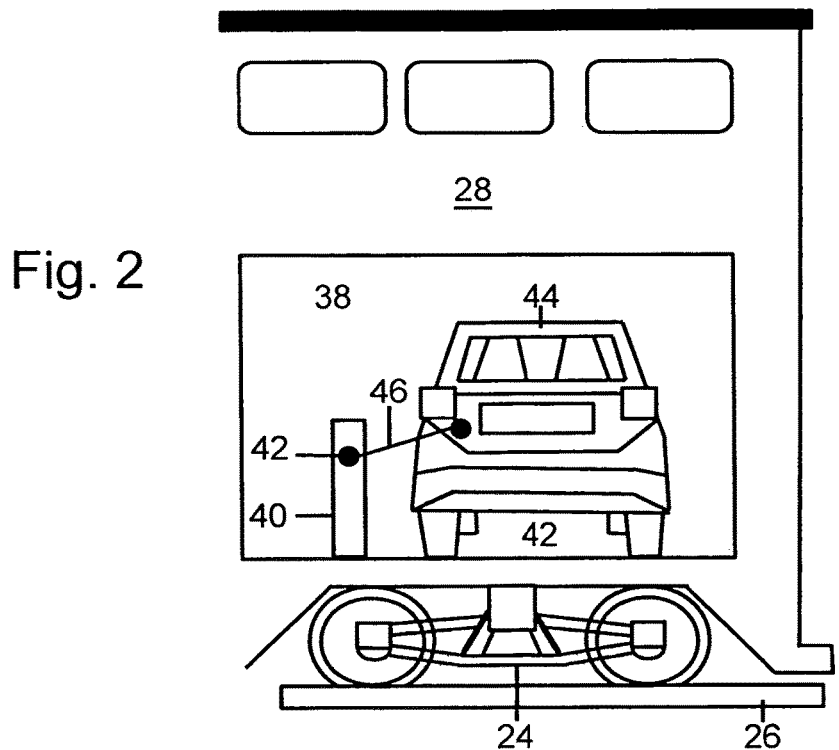
FIG. 2 shows one compartment of a modified bi-level railroad passenger car with the view of one charging station.

FIG. 2 shows one compartment of a modified bi-level railroad passenger car 28 with the view of one charging station 40. The charging station houses the electrical wiring and supports an electrical outlet 42 utilized to plug in the automobile's power cord 46. The illustration shows one automobile that has its power cord plugged into the outlet on the charging station. The battery of the automobile is being charged. The bed of the car sits above suitable trucks which support the body of the car on rails in accordance with another embodiment.

Figure 3:
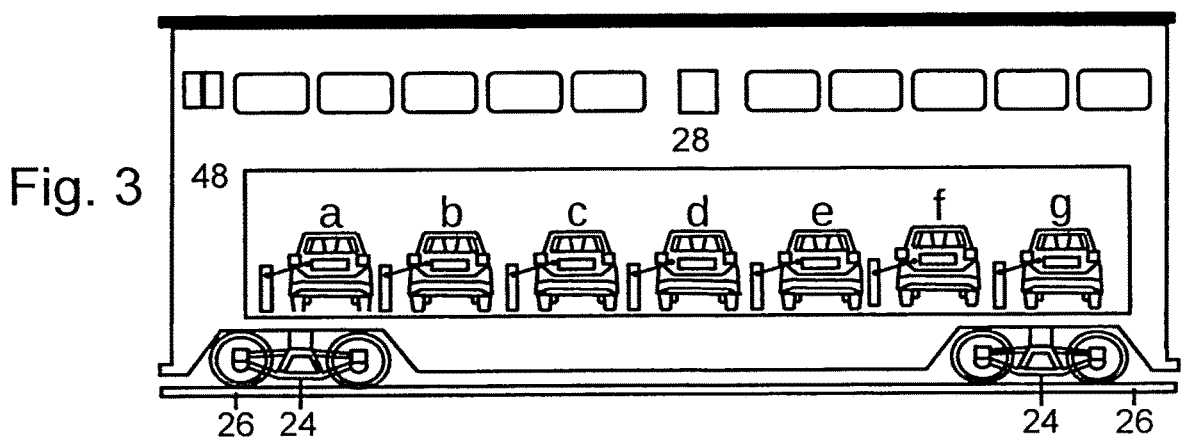
FIG. 3 shows a modified bi-level railroad passenger car with a hollowed out lower level.

FIG. 3 shows a modified bi-level railroad passenger car 28 with a hollowed out lower level. The illustration shows the car is loaded with seven automobiles 48(*a-g*). The automobiles' power cords are plugged into the outlet on the charging stations and the automobiles' batteries are being charged in accordance with another embodiment.

Figure 4:
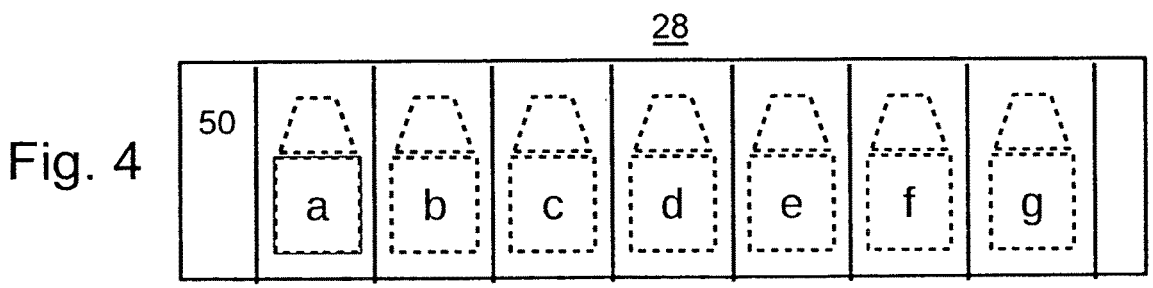
FIG. 4 shows the bed or floor of a modified bi-level railroad passenger car.

FIG. 4 shows the bed or floor of a modified bi-level railroad passenger car. The bed of the car has a number of compartments 50(*a-g*) which are equal in size and shape. Each compartment allows the length and width of one Smart car, or similar sized automobile, to sit safely across the bed of the car during transport. Each of the compartments has a charging station (not shown) which houses the electrical wiring to charge the batteries of the electric automobiles (view from above) in accordance with another embodiment.

Figure 5A:
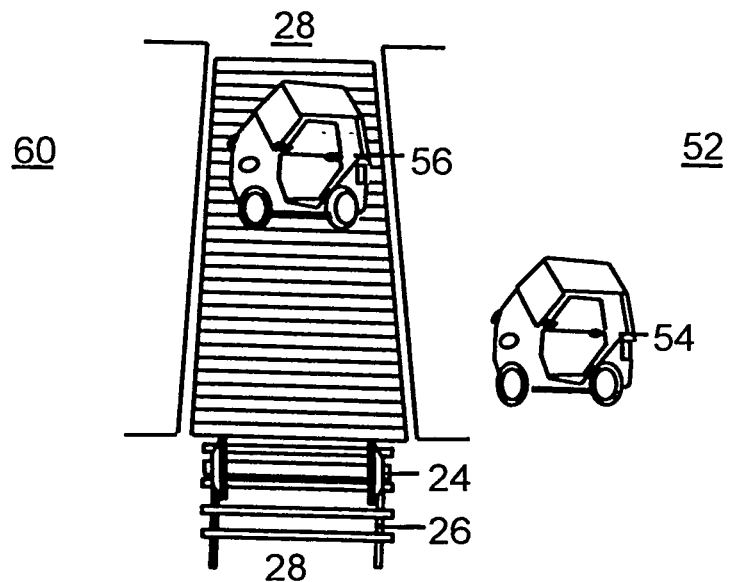
FIGS. 5A to 5C show the loading and unloading of the automobiles using the loading and unloading docks that are on the same level as the bed of the car in accordance with another embodiment.

FIG. 5A shows the bed or floor of a modified bi-level railroad passenger car with one automobile 56 loaded on the car. Automobile 54 is waiting to load onto the car.

Figure 5B:
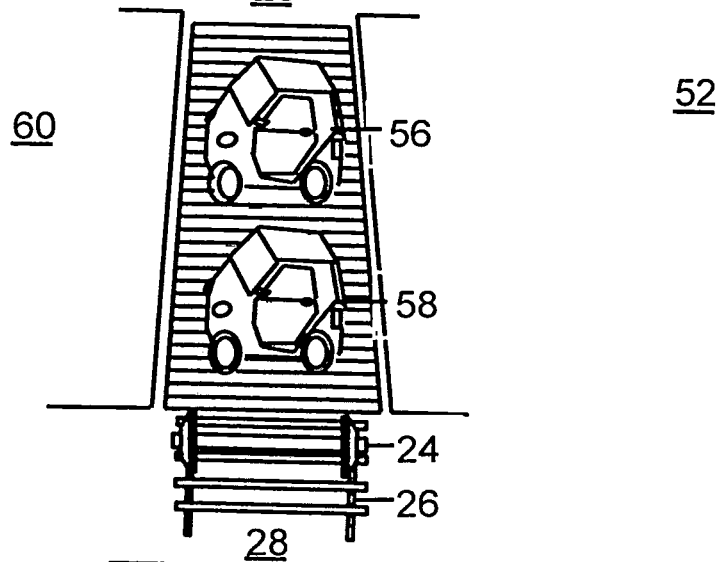

FIG. 5B shows automobile 54 has loaded onto the car next to automobile 56.

Figure 5C:
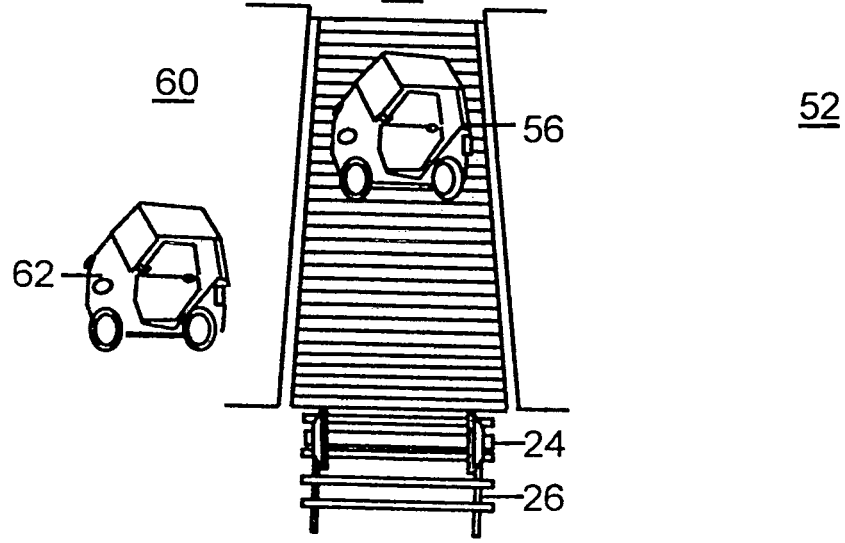

FIG. 5C shows automobile 54 has unloaded onto the unloading dock 60.

Figure 6:
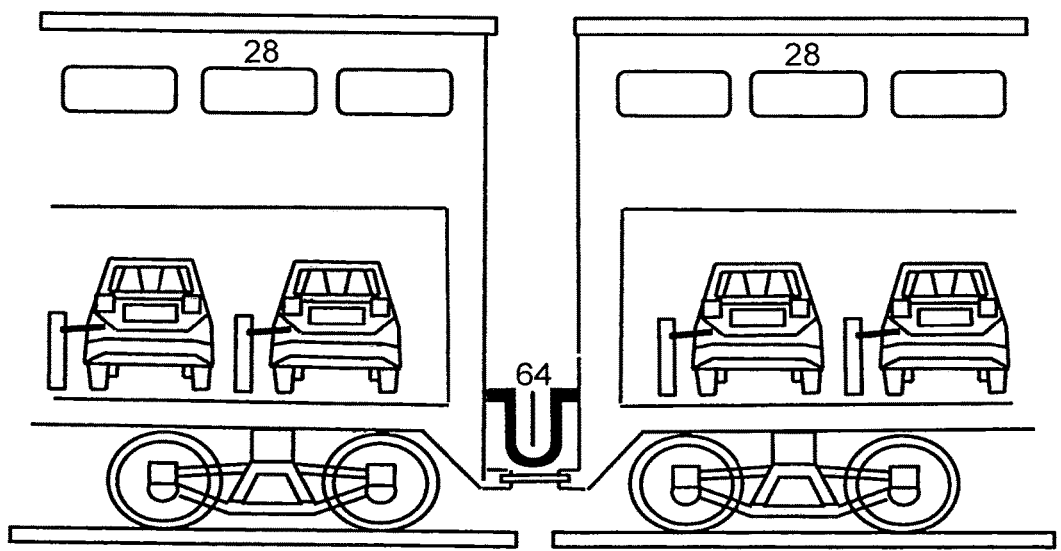
FIG. 6 shows one cable that is connected between two cars.

FIG. 6 shows one cable 64 that is connected between two cars 28. The illustration does not show a second cable that runs parallel to the first cable. The cable system runs between the cars the length of the train in accordance with another embodiment.

Figure 7:
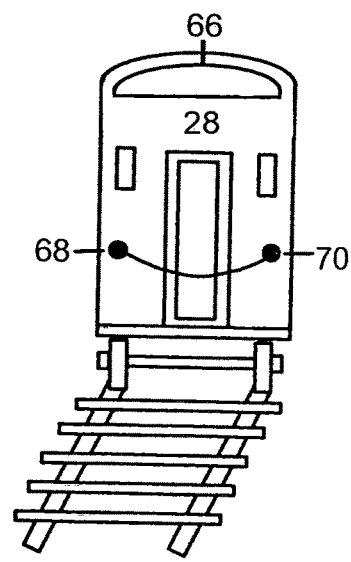
FIG. 7 shows the last car of the train with a connecting cable.

FIG. 7 shows the last car 28 of the train with a cable that runs from one side of the car to the other side of the car in accordance with another embodiment.

Figure 8:
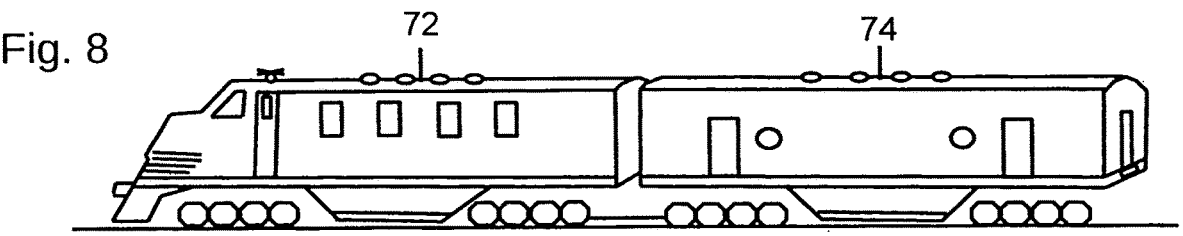
FIG. 8 shows a locomotive and a designated generator car.

FIG. 8 shows locomotive 72 and designated generator car 74 in accordance with another embodiment.

The illustrations commence with a drawing depicting an embodiment of a conventional bi-level, railroad passenger car FIG. 1A. The car has all of the standards of a railroad passenger car: rigid side walls and end walls, a roof, ceiling, flooring, upper and lower level windows, entrance/exit doors, comfortable seating for commuters in both the upper and lower levels of the car all of which are standard stock. The car also has a coffee shop, and restroom facilities. Other cars offer dining room facilities and sleeping quarters for those passengers taking a long-distance trip (not shown). The car has suitable trucks of conventional construction which are located underneath the bed of the car. The trucks support the entire car on rails.

The preferred embodiment of the car illustrated in FIG. 1B is a modified bi-level, railroad passenger car equipped to provide electricity to electrically charge the batteries of battery-powered electric automobiles, either on a car by car basis, using the wheels of the car to generate electricity, or as the whole of the train supplied with power generated by a locomotive, a designated generator car, an outside source or helper locomotives.

The modified car basically has the same structure and all the standard equipment of the conventional bi-level passenger car, except that the lower level of the car has had the rigid side walls removed. The car has all the standard equipment of a railroad passenger car: rigid end walls, a roof, ceiling, and flooring, upper level windows, comfortable seating for commuters. There is a staircase between floors inside the car. There are connecting doors between the cars on the upper and lower levels. The car also has restroom facilities, and a coffee shop. Other cars offer dining room facilities and sleeping quarters for those passengers taking a long-distance trip. The roof of the car has solar panels that are installed as a part of the electrical system. The car has suitable trucks of conventional construction which are located underneath the bed of the car. The trucks support the entire car on rails.

The modified car basically has the same body as a conventional bi-level railroad passenger car, except that the modified car has had the long rigid side panels of the lower level of the car removed. The rigid end walls, added beams, and columns throughout the area support the roof and ceiling of the car. The removal of the rigid side panels allows automobiles access to the bed of the car. The bed of the car is converted into compartments to load the commuters' automobiles. The seating, computer workstations, and other items on the bed of the car, have been removed to make room for the compartments.

The size of the car is 85 feet long and 10 feet 6 inches wide. The bed of the car has a number of compartments that are equal in size and space. The size of a compartment is 12 feet in length by 10 feet 6 inches in width (the width of the car). The average dimensions of a Smart car, or similar size automobile is 8 feet 8 inches long, and 5 feet 1 inches wide. Each compartment allows for the width and length of one Smart car, or similar-sized automobile to sit safely across the bed of the car during transport. The measurements should allow two feet between automobiles, enough space for both the driver and passenger to easily enter and exit the vehicle.

The loading and unloading of the automobiles is simple. The commuter drives his or her automobile directly into a compartment on the car using loading docks that are level with the bed of the car. To unload an automobile, the commuter drives the automobile out of the compartment and onto a dock. No mechanical or automated parts are required to load and unload an automobile.

Each compartment has guide rails which guide the automobile's wheels into an aperture. The aperture blocks keep the automobile from over-running the compartment. Wheel locks raise from the aperture, and close around the automobile's wheels, thus stabilizing the lower half of the automobile during transport. The wheel locks and blocks open up to allow the automobile to drive forward and out of the compartment onto the dock to depart the car.

The trains have established electrical systems already in place. The systems are mainly computerized and handle the many complicated calculations and problems the engineers must face each day. One of the electrical systems is concerned with the full electrical load each car must be able to carry, no matter where the car is placed in the train. Every car must have compatible electrical plugs and sockets at each end of the car. These sockets and plugs (connectors) function to transmit power throughout the train from one car to the next car in line.

The plugs and receptacles are on each end of the car for a total of four plugs and four receptacles. This system splits the load among four sets of cables connected to the plugs and receptacles. This arrangement makes the car a part of the electrical circuit for the entire train.

The last car of the train has a plug on one side of the car which is connected by a cable to the receptacle on the other side of the car. An electrical circuit is therefore created and is complete.

Engineers use the term head-end power HEP or electric train supply ETS to distinguish one electrical distribution systems of a passenger train from another electrical supply system of the train. The HEP system is "unto itself" a source of power. Usually a locomotive (or a generator car) at the front or "head" of the train, produces all of the electricity needed for HEP. Electricity that is produced for HEP by a locomotive, or a designated generator car, is used only for heating, lighting, climate control, refrigeration, cooking and other electrical requirements, except in an emergency situation. A situation is deemed an emergency if the locomotive is pulling the train up a steep incline, and more power is needed to climb the grade. The Engineer can divert the electricity usually reserved for HEP and use the energy for the emergency to climb the grade. Amtrak, for example uses three-phase AC at 480 volts 60 Hz for its head-end or HEP, which is standard in the United States.

II. Operation

Before the train leaves the yard, engineers must take into consideration various functions and aspects of the train. There is a tremendous amount of responsibility in handling the amount of rolling stock that crosses the country each day. In order to safely set out each train on its route, engineers use formulas to calculate the many aspects of running a train. A formula is used to calculate force levels when starting a train. Another formula is used to determine drawbar force or how much tonnage a road engine can handle. Engineers must take into account how many locomotives should be in the road consist and where they should be placed. These locomotives or helpers, as they are called, are needed to push and pull the train up a grade. If more speed is needed, then a formula is used to calculate how much more power is required.

When STARTING a train, calculations are used to determine the force level that is needed, a formula that is used is:

30 lbs per ton for each % of grade (30×T)×% G=f. X×12/2=12 mph. If SD40s (locomotives) are 3,000 hp each and the train is 10,000 tons, a grade of 2% will be ascended at 12 mph. The formula the engineer uses is the following:

To solve for "x", X×12/2+12 mph. If the train is 10,000 tons it will take a minimum of 20,000 hp. The train will require a minimum of seven SD40s to supply the 21,000 hp the train will need to ascend the grade. The train is 10,000 tons and needs to ascend a grade of 2% at 12 mph. The SDs are 3,000 hp each. A formula is used to solve for "x". X×12/2=12 mph. We find that 2 hp will allow us to operate at 12 mph. Since we have 10,000 tons, it will take a minimum of 20,000 hp. So, a minimum of seven SD40s would be needed to supply 21,000 hp.

Next, a rolling train resistance formula is used to calculate the drawbar force levels. The train is 10,000 tons times 20=200,000 times the 2% G+5=400,005 lbs. The 4000, 005 lbs is way over 240,000 limit, so the power needs to be split up.

Using the formula further, calculate how much tonnage the road engine will handle and how many locomotives should be in the road consist and how many should help. If a higher target speed is desired, then more power will be needed and distributed accordingly.

There is one other thing to consider. When placing the helper, it must be entrained such that it shoves ⅓ of the tonnage it will handle and pulls ⅔ of the tonnage. The engineer must figure this in as the helper could shove the cars ahead of it off the track. If the helper must pull a tonnage which exceeds 240,000 lbs of force, then another helper is added to counteract the force.

The weight of the automobiles must be calculated into the equation, will be continuously loaded and unloaded, it must be assumed that engineers will use the necessary calculations that are needed to supply the electricity to charge the automobiles and will they choose 110 or 220 the force, pull and push and the number of locomotives that are needed by the train.

As with other fields of study expertise, engineers have their own terminology whereby just one of two words or letters explains a whole subject matter. This is the case of the term head-end power (HEP) or electric train supply (ETS).

Engineers use the term head-end power (HEP) or electric train supply (ETS) to define the electrical distribution system of a passenger train. The source of the power-is usually a locomotive (or a generator car) at the front of or "head" of the train, hence the name head-end or front-end power. The electricity produced by one designated locomotive or generator car is used only for heating, lighting, climate control, refrigeration, cooking and other electrical requirements, except in an emergency situation. A situation is deemed an emergency when the locomotive is pulling the train up a steep incline, and more power is needed to climb the grade. The Engineer can pull the HEP power for an emergency.

Amtrak, for example uses three-phase AC at 480 volts 60 Hz for its head-end power, which is standard in the United States. Power is supplied to the cars of the train by the locomotive or a dedicated generator car.

Each car is equipped with cabling and connectors (four at each end) capable of passing 1,200 kW (1.2 m W) of power, at 400 amps, along the entire train, regardless of the car's position in the train.

Each car must be able to carry the full electrical load of the train, irrespective of the car's position in the train. Each car must have compatible electrical plugs and sockets at each end. These connectors (plugs and sockets) are designed to transmit power from one car to the next.

To accomplish this, each car has a plug and receptacle on each side of each end, for a total of four plugs and four receptacles. In this manner, the load is actually split among the four sets of cables, and the car is part of the electrical circuit for the entire train.

To complete the circuit, the last car at each end of the train has its plug on one side connected to the receptacle on the other side.

Again, using Amtrak as an example, Amtrak's HEP uses 480V AC, at about 200 Amps and 96 kW. Which Amtrak limits to 85 kW per car. This standard limits the train size to about 15 cars, based on Amtrak's limit of 1,200 kW per train.

The two Head End Power systems in use today depend on the 480V standard industrial U.S. voltage, or the 575V industrial Canadian voltage.

III. Advantages

Individual expansions of one or more of the aspects are as follows:

That a modified bi-level double decker passenger car is specifically manufactured to charge the batteries of battery-powered electric automobiles. Said car either provides power on a car by car basis, using the wheels of the car to generate electricity, or as a part or the whole of the train supplying electricity generated by a locomotive and designated generator car.

That said car offers a means of electrically charging the batteries of electric automobiles while in transit.

That the car has suitable trucks of conventional construction which are located underneath the bed of the car.

That the trucks support the entire car on rails.

That the bed of the car sits above the trucks of the car.

That the car is suitably braced and framed.

That the bed of the car has a number of equally sized and equally-spaced automobile carrying compartments.

That each compartment allows for the width of one Smart car, or similar-sized automobile to sit safely across the bed of the car during transport.

That the loading and unloading of the cars is simple and efficient using loading and unloading docks that are on the same level as the bed of the car.

That the automobile is driven from the loading dock on one side of the car into the car to load, and be charged while in transit. The automobile is driven out of the car onto the dock on the other side of the car.

That the electric wiring and electrical outlets that charge the batteries of the electrical automobiles are housed in and on stanchions bolted to the floor of each compartment.

That the stanchions are the charging stations.

That the automobile's power plug is plugged into an outlet on the charging station.

That the car has rigid walls at each end of the car.

That the lower level of the car is hollowed out.

That there are no side walls of the lower level of the car.

That the open area of the lower level of the car allows automobiles to easily enter the car directly from the loading dock.

That the commuter drives his or her automobile directly from the loading dock onto the bed of the car and directly into a compartment.

That each compartment has guide rails which guide the automobile's wheels into an aperture to keep the automobile from over-running the compartment.

That wheel locks raise and close around the automobile's wheels to stabilize the lower half of the automobile during transport.

That the wheel locks lower back down allowing the automobile to drive out of the car onto the dock on the other side of the car.

That the upper level of the car is conventional, intended for seating for the commuters.

That the upper level of the car also has restroom faculties, a coffee shop and a dining area that there are sleeping quarters for those passengers taking long distance trips.

That there is a staircase between floors inside the car.

That there are connecting doors between cars on the lower and upper floors.

That a separate car has accommodations for those individuals who use wheelchairs, walkers and other assistance.

IV. Conclusion, Ramifications, and Scope

Accordingly the reader will see that the modified, hollowed-out, bi-level passenger car is equipped to provide electricity to electrically charge the batteries of battery-powered electric automobiles, either on a car by car basis, using the wheels of the car to generate electricity, or as the whole of the train supplied with power generated by a locomotive, other designated generator cars, by solar panels, an outside source, a third rail, overhead electric wires, helper locomotives or a combination of any or all of the above sources of power. Furthermore, the dimensions of the car are in accord with code. The width or length of the car does not need to be altered, that the existing railroad tracks are adequate, that the tracks require minimal modifications to load and unload the vehicles at the railroad stations, that the car is able to travel normally along the train tracks easily passing through tunnels, negotiating overpasses, and traversing bridges without any difficulty, that the car has suitable trucks of conventional construction which are located underneath the bed of the car, that the trucks support the entire car on rails. The bed of the car has a number of same sized and same-spaced automobile carrying compartments that each compartment allows for the width of one Smart car, or similar-sized automobile to sit safely across the bed of the car during transport. The electrical wiring to charge the battery of an automobile is housed in a stanchion that is bolted to the floor in each compartment. An electric outlet occupies the front of the stanchion. The stanchion is the charging station where the automobile's power cord is inserted into the outlet on the charging station. The charging station is activated once the power cord is plugged into the outlet and turned on.

The loading and unloading of the automobiles is straightforward. The commuter drives his or her automobile directly into a compartment on the car using a loading dock that is level with the bed of the car. To unload an automobile, the commuter drives his or her automobile straightforward out of the compartment and onto a dock to unload. No mechanical parts are required to load and unload an automobile. The docks are on the same level as the bed of the car making loading and unloading the automobile efficient and cost effective.

Many commuters refuse to take public transportation. They prefer to drive to and from work each day. Their reasons are varied. The railroad commuter cars offer commuters the luxury of not being stuck in bumper-to-bumper traffic on the freeways each day. Rather than dealing with stop and go traffic, the commuters can sit back and relax either in their automobiles for a short trip, or they can take advantage of the comfortable seating, the passenger car's restrooms, coffee shop, dining room and other amenities. There are sleeping quarters for long distance trips. There are also Wifi connections and workstations for those individuals who need or want to work or just answer their email.

"Although the description above contains many specificities, these should not be construed as limiting the scope of the embodiments but as merely providing illustrations of some of several embodiments."

"The scope of the embodiments should be determined by the appended claims and their legal equivalents, rather than by the examples given."

V. List of Reference Numerals

10 conventional bi-level railroad passenger car
12 roof of car
14 windows (second floor)
16 entrance exit door (first floor)
18 windows (first floor)
20 rigid end walls
22 rigid side walls
24 trucks
26 railroad tracks
28 a modified bi-level railroad passenger car first level of car hollowed out
30 ceiling of car (first floor)
32 bed or floor of car (first floor)
34 rigid side walls of car removed first floor hollowed out
36 seven automobiles loaded on car (a-g)

38 automobile compartment
40 charging station
42 electrical outlet
44 automobile
46 automobile's charging cord plugged into outlet
48 seven automobiles loaded on car and charging (a-g)
50 seven compartment with outline of automobiles (a-g)
52 car level with dock (view from above)
54 automobile A waiting to load on car
56 automobile B loaded on car from previous stop
58 automobile A loaded on car alongside automobile B
60 street level dock to unload automobiles
62 automobile A unloaded on dock
64 electric cables connected between cars A and B
66 last car on train
68 receptacle with socket and cable
70 plug with cable plugged into socket on opposite side of car
72 locomotive
74 a designated generator car

The invention claimed is:

1. A passenger and automobile transporting train having a plurality of railroad cars comprising:

first level for transporting passengers;

second level for transporting electric automobiles;

an electrical power source for charging the electric automobiles;

an electrical circuit between the electrical power source and the electric automobiles;

an electrical plug and an electrical receptacle provided at an end of the last railroad car of the plurality of said railroad cars and configured as parts of the electrical circuit for the train; and an electrical cable connecting one of the electrical plug and the electrical receptacle located on one side of the last railroad car to the other one of the electrical plug and the electrical receptacle located on the other side of the last railroad car to complete the electrical circuit.

2. The passenger and automobile transporting train of claim 1, wherein the power source includes a generator car.

\* \* \* \* \*